(12) United States Patent
Park et al.

(10) Patent No.: US 8,594,099 B2
(45) Date of Patent: Nov. 26, 2013

(54) TUNNELING-BASED MOBILITY SUPPORT EQUIPMENT AND METHOD

(75) Inventors: Pyung-koo Park, Daejeon-si (KR);
Sung-back Hong, Daejeon-si (KR);
Kyeong-ho Lee, Daejeon-si (KR);
Kyung-pyo Jun, Daejeon-si (KR);
Bong-tae Kim, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 442 days.

(21) Appl. No.: 12/865,933

(22) PCT Filed: Nov. 23, 2009

(86) PCT No.: PCT/KR2009/006898
§ 371 (c)(1),
(2), (4) Date: Aug. 3, 2010

(87) PCT Pub. No.: WO2010/064801
PCT Pub. Date: Jun. 10, 2010

(65) Prior Publication Data
US 2011/0002220 A1 Jan. 6, 2011

(30) Foreign Application Priority Data

Dec. 4, 2008 (KR) .......................... 10-2008-0122658
Mar. 31, 2009 (KR) .......................... 10-2009-0027766

(51) Int. Cl.
*H04L 12/28* (2006.01)
*H04Q 11/04* (2006.01)

(52) U.S. Cl.
CPC ................................. *H04Q 11/0478* (2013.01)
USPC ........................................ 370/395.2; 370/230

(58) Field of Classification Search
USPC ................. 370/216–228, 230–235, 241–252, 370/310–350, 395.2, 395.3; 455/436, 437, 455/453; 709/223–226
See application file for complete search history.

(56) References Cited

U.S. PATENT DOCUMENTS

| 7,711,819 B2 | 5/2010 | Ono et al. |
| 8,218,502 B1 * | 7/2012 | Liu et al. .................. 370/331 |

(Continued)

FOREIGN PATENT DOCUMENTS

| CN | 1416064 | 5/2003 |
| CN | 1666476 | 9/2005 |

(Continued)

OTHER PUBLICATIONS

International Search Report and Written Opinion for Application No. PCT/KR2009/006898, dated Jul. 7, 2011.

(Continued)

*Primary Examiner* — Kan Yuen
(74) *Attorney, Agent, or Firm* — Nelson Mullins Riley & Scarborough LLP

(57) ABSTRACT

A tunneling-based mobility support method and apparatus is provided which supports a mobility of a mobile node in a heterogeneous network regardless of IP versions (IPv4/IPv6). The mobility support apparatus includes a load balancer, a plurality of mobility support servers, and a plurality of end routers each being TCP connected to each of the mobility support servers. When receiving a tunnel establishment request message from the mobile node, the load balancer selects one mobility supports server from a plurality of mobility support servers to control a mobility service for the mobile node. The selected mobility support server selects a plurality of tunnel end addresses of one end router from the plurality of end routers to establish an IP tunnel with the mobile node according to a predetermined criterion, forwards the tunnel establishment request message to the end router, and sends the mobile node a tunnel establishment response message including the tunnel end address of the selected end router.

14 Claims, 9 Drawing Sheets

(56) References Cited

U.S. PATENT DOCUMENTS

| | | | |
|---|---|---|---|
| 2004/0008707 A1* | 1/2004 | Nakamichi et al. | 370/401 |
| 2005/0188065 A1* | 8/2005 | O'Rourke et al. | 709/223 |
| 2006/0092964 A1* | 5/2006 | Park et al. | 370/437 |
| 2006/0176854 A1 | 8/2006 | Jang et al. | |
| 2007/0070933 A1 | 3/2007 | Chan et al. | |
| 2010/0172302 A1* | 7/2010 | Dunk | 370/328 |

FOREIGN PATENT DOCUMENTS

| | | |
|---|---|---|
| CN | 1736077 | 2/2006 |
| CN | 1770718 | 5/2006 |
| CN | 101310542 | 11/2008 |
| EP | 1653704 A1 | 5/2006 |
| KR | 1020080050238 | 6/2008 |
| KR | 1020080050280 | 6/2008 |
| WO | 2004/006537 A2 | 1/2004 |
| WO | 2004/049668 A1 | 6/2004 |
| WO | 2004/082192 A2 | 9/2004 |
| WO | 2005/076649 A1 | 8/2005 |
| WO | 2007/082132 A2 | 7/2007 |
| WO | 2008/052580 A1 | 5/2008 |
| WO | 2009/005212 A1 | 1/2009 |

OTHER PUBLICATIONS

Chinese Office Action for Application No. 200980107223.5, 13 pages, dated Jun. 27, 2013.

* cited by examiner

US 8,594,099 B2

TUNNELING-BASED MOBILITY SUPPORT EQUIPMENT AND METHOD

RELATED APPLICATIONS

This application is a 35 U.S.C. §371 national stage filing of PCT Application No. PCT/KR2009/006898 filed on Nov. 23, 2009, which claims priority to, and the benefit of, Korean Patent Application No. 10-2008-0122658 filed on Dec. 4, 2008 and Korean Patent Application No. 10-2009-0027766 filed on Mar. 31, 2009. The contents of the aforementioned applications are hereby incorporated by reference.

TECHNICAL FIELD

The following description relates to a method and apparatus for supporting a mobility of a mobile node and, more particularly, to a method and apparatus for supporting a tunneling-based mobility for a mobile node which makes an access to a heterogeneous Internet Protocol (IP) network.

BACKGROUND ART

When an IPv4/IPv6 (Internet Protocol version 4/6) mobile node hands over to a new network, the IPv4/IPv6 mobile node disconnects an old access network and connects to a new access network to make a communication. A delay in a handover process may result in a non-seamless service in interruption of a real-time service. Such a delay in a handover process also occurs in a Mobile IPv6 (MIPv6). In MIPv6, if a mobile node detects a new access point, layer 2 (L2) handover is performed and layer 3 (L3) handover is then performed, a delay in a handover process is unavoidable.

To reduce the handover delay in MIPv6, IETF (Internet Engineering Task Force) has proposed a fast handover for MIPv6 (FMIPv6). FMIPv6 performs layer 3 handover prior to layer 2 handover, thereby minimizing the handover delay. However, since FMIPv6 requires buffering a data traffic and signaling with a home agent, complexity for a mobile node supporting FMUPv6 increases. Furthermore, in FMIPv6, an access router only supports IPv6. However, since IPv6 and IPv4 networks still coexist, IPv4 also needs to be supported.

To support a handover to provide a seamless service in a heterogeneous network including IPv6 and IPv4 networks, a mobility support system including an IPv6 mobility support server has been proposed. More specifically, an IPv6 mobile node with multiple wireless interfaces establishes L2 protocol through each interface and establishes an active tunnel and a standby tunnel with the mobility support server. In this case, the mobile node makes a communication through the active tunnel and, when moving to another network, activates the standby tunnel to keep performing the communication. In this case, L2 agreement with the new network has been performed and known L3 information is used, thereby reducing the time period for L2 and L3 handover.

However, since each mobile node establishes active and standby tunnels with the mobility support server in the mobility support system, a great amount of load may be imposed on the mobility support server. Accordingly, the mobility support system may not deal in a flexible manner with an increased number of subscriber mobile nodes. More specifically, the increased number of subscriber mobile nodes may cause an increased burden on the mobility support server in terms of establishment and management of tunnels. Furthermore, an immediate increase in the number or capacity of the mobility support servers is limited. In addition, the increased number of subscriber mobile nodes may lead to an increased amount of messages or data to be processed by the mobility support server, resulting in an increased burden imposed on the mobility support server.

DISCLOSURE OF INVENTION

Technical Problem

The following description relates to a tunneling-based mobility support method and apparatus which deals in a flexible and efficient manner with a change in the number of subscriber mobile nodes in a tunneling-based mobility support system supporting a handover in a heterogeneous network.

The following description also relates to a tunneling-based mobility support method and apparatus which minimizes a burden on a mobility support server imposed due to an increased number of subscriber mobile nodes and efficiently distributes a burden on a plurality of mobility support servers included in a mobility support apparatus.

The following description also relates to a tunneling-based mobility support method and apparatus which provides a seamless service to mobile nodes during a handover.

Technical Solution

The following description relates to a tunneling-based mobility support method and apparatus which deals in a flexible and efficient manner with a change in the number of subscriber mobile nodes in a tunneling-based mobility support system supporting a handover in a heterogeneous network.

The following description also relates to a tunneling-based mobility support method and apparatus which minimizes a burden on a mobility support server imposed due to an increased number of subscriber mobile nodes and efficiently distributes a burden on a plurality of mobility support servers included in a mobility support apparatus.

The following description also relates to a tunneling-based mobility support method and apparatus which provides a seamless service to mobile nodes during a handover.

In one general aspect, a tunneling-based mobility support method is provided for a mobility support server which enables a mobile node to make a seamless communication when moving from a current access network to a different access network. More specifically, when receiving from a mobile node a tunnel establishment request message requesting IP tunnel establishment, the mobility support server may select one end router from a plurality of end routers and a tunnel end address of the selected end router and forward the tunnel establishment request message to the end router. When receiving a response to the tunnel establishment request message from the end router, the mobility support server may forward the tunnel establishment response message including the selected tunnel end address to the mobile node. Examples of the mobile node may include an IPv4 mobile node, an IPv6 mobile node or an IPv4/IPv6 mobile node. If the mobile node attempts to make a communication with an IPv6 address over an IPv4 network, the mobility support server may establish an IPv6-over-IPv4 tunnel between the mobile node and the end router. If the mobile node attempts to make a communication with an IPv6 address over an IPv6 network, the mobility support server may establish an IPv6-over-IPv6 tunnel between the mobile node and the end router. If the mobile node attempts to make a communication with an IPv4 address over an IPv6 network, the mobility support server may establish an IPv4-over-IPv6 tunnel between the mobile node and the end router.

In another general aspect, a tunneling-based mobility support method is provided for a mobility support apparatus which supports a mobility of a mobile node which makes an access over a plurality of IP networks. More specifically, when receiving from a mobile node a tunnel establishment request message requesting IP tunnel establishment, the mobility support apparatus may select one mobility support server from a plurality of mobility support servers to control a mobility service for the mobile node in the mobility support apparatus. The mobility support server may be selected by a load balancer in the mobility support apparatus. The selected mobility support server may select one end router from a plurality of end routers to establish an IP tunnel with the mobile node in the mobility support apparatus and select a tunnel end address of the selected end router. The mobility support server may send the mobile node a tunnel establishment response message including the selected tunnel end address of the end router.

In a further general aspect, a tunneling-based mobility support apparatus is provided which supports a mobility of a mobile node which makes an access over a plurality of IP networks. The tunneling-based mobility support apparatus may include at least one mobility support server and a plurality of end routers, and further include a load balancer. When receiving an IP tunnel establishment request from the mobile node, the mobility support server may select one end router from a plurality of TCP-connected end routers to establish an IP tunnel with the mobile node, and a tunnel end address of the selected end router. The mobility support server may send the selected tunnel end address of the end router to the mobile node. When receiving the tunnel establishment request message from the mobility support server, the end router may establish an IP tunnel with the mobile node on a data plane.

The load balancer may be needed when there are a plurality of mobility support servers. The load balancer may receive an IP tunnel establishment request from the mobile node, select one mobility support server from the plurality of mobility support servers in response to the tunnel establishment request, and forward the tunnel establishment request message to the selected mobility support server.

Advantageous Effects

The mobility support apparatus includes the mobility support servers and the end routers to share functions to provide mobility services, thereby reducing a burden imposed on the mobility support servers. In particular, the end routers, on behalf of the mobility support servers, may manage tunnels established with the mobile node or transmit data to the correspondent node.

Furthermore, the mobility support apparatus further includes the load balancer in addition to the mobility support servers and the end routers. When an increased capacity of the mobility support server is needed due to an increased number of subscribers to the mobility support services, the load balancer is configured for the mobility support servers to share their tasks to provide the mobility support services, thereby facilitating adding mobility support servers. Accordingly, it is possible to ensure a seamless mobility support service and provide a more reliable mobility support service.

BEST MODE FOR CARRYING OUT THE INVENTION

The detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions are omitted to increase clarity and conciseness.

A mobility service will be first described which is supported by an exemplary method and system for supporting a tunneling-based mobility for a mobile node.

Figure 1:
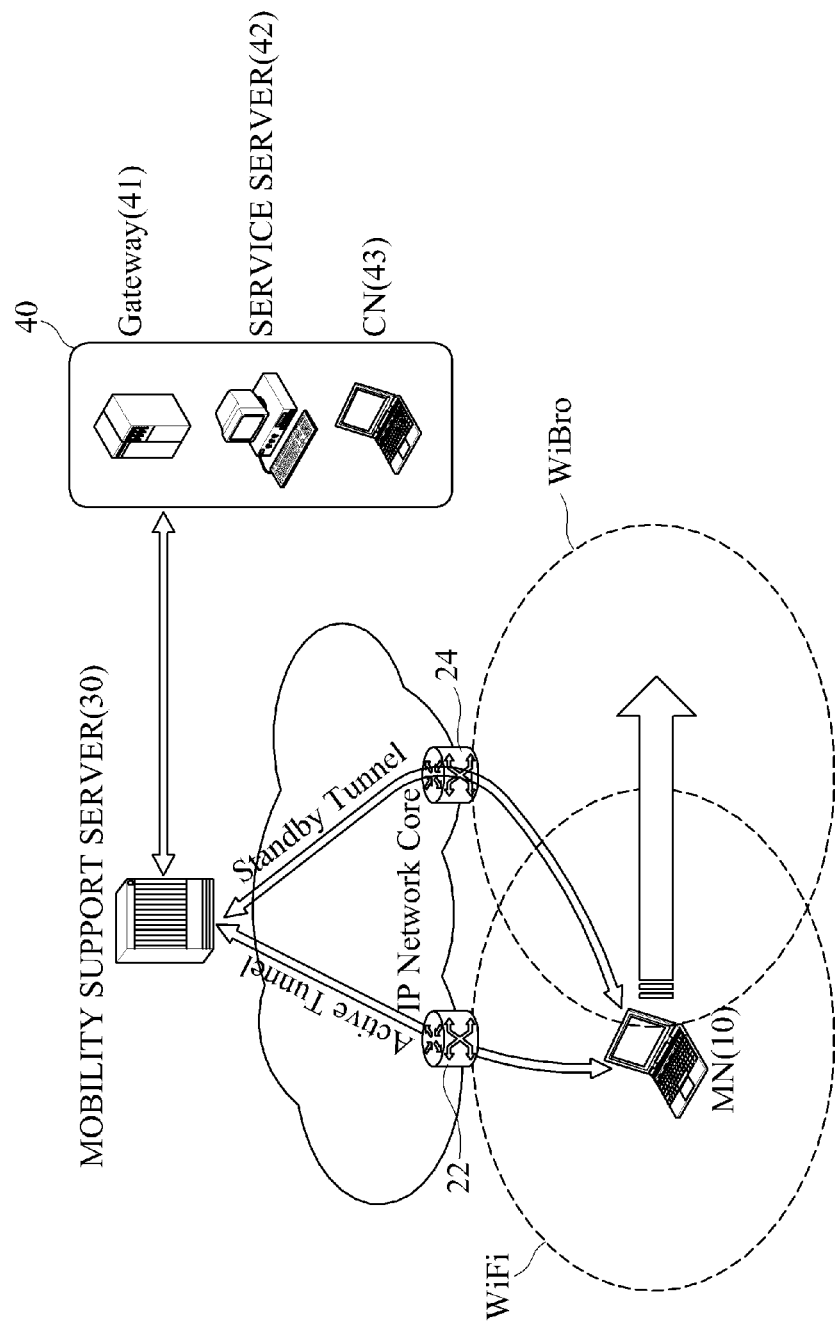
FIG. 1 is a diagram illustrating an example of a mobility service which is supported by an exemplary method and system for supporting a tunneling-based mobility for a mobile node.

FIG. 1 is a diagram illustrating an example of the mobility service which is supported by an exemplary method and system for supporting a tunneling-based mobility for a mobile node. FIG. 1 illustrates a mobile node (MN) 10 which travels from a Wi-Fi network to a WiBro network, but the current example is not limited to this case. In FIG. 1, reference numerals 22 and 24 denote gateways or routers to Wi-Fi network and WiBro network.

Referring to FIG. 1, the mobile node 10 establishes an active tunnel and a standby tunnel over an IP network core. The standby tunnel refers to a temporary or substitute tunnel which is reserved for the active tunnel being unavailable for the service due to a weak signal or a blanket area as the mobile node 10 is moved. The mobile node 10 may be an IPv4 mobile node and/or an IPv6 mobile node (hereinafter referred to as IPv4/6 mobile node). The mobile node 10 may access a heterogeneous network including Wi-Fi network and WiBro network and support a mobility among different types of networks. The mobile node 10 is also referred to as a mobility support terminal. Hereinafter, the mobile node refers to a mobility support IPv4/6 mobile node unless specified otherwise.

The mobility support terminal 10 traveling from Wi-Fi network to WiBro network establishes an active tunnel through Wi-Fi interface and establishes a standby tunnel through WiBro interface. There is no limitation on the type of interface through which the mobility support terminal 10 establishes the active tunnel and the standby tunnel. For example, the type of interface for the active tunnel or the standby tunnel for the mobility support terminal 10 may be determined by service quality, service charge or user's election.

The tunneling-based mobility support service will be described in more detail with respect to FIG. 1. As the mobility support terminal 10 moves in a direction of an arrow shown in FIG. 1, a signal received by the mobility support terminal 10 over an active tunnel on the Wi-Fi network may become weak. In this case, the mobility support terminal 10 may notify the mobility support server 30 over the Wi-Fi network that it will keep a communication through a standby tunnel. The mobility support terminal 10 may then change the standby tunnel to an active tunnel and continue to make a communicate over the WiBro network. In this case, since the mobility support terminal 10 has made L2 association for WiBro network and has established an IP tunnel, it is possible to minimize a handover delay. Although not shown in FIG. 1, after changing the standby tunnel to the active tunnel upon performing a handover, the mobility support terminal 10 establishes another standby tunnel over a different access network (e.g., mobile communication network such as Wi-Fi network or 3GPP) to prepare for a handover from the WiBro network.

According to the mobility service, although the mobility support terminal 10 accesses a network other than a currently accessing network, the mobility support terminal 10 may receive a seamless service from the mobility support server 30. For example, when the mobility support terminal 10 is communicating with a device 40 which is connected to the mobility support server 30, such as a gateway 41 accessing another network, a service server 42 or a correspondent node (CN) 43, the mobility support terminal 10 may continue to make a seamless communication with the device 40 on a different access network by means of the tunneling-based mobility service.

Figure 2:
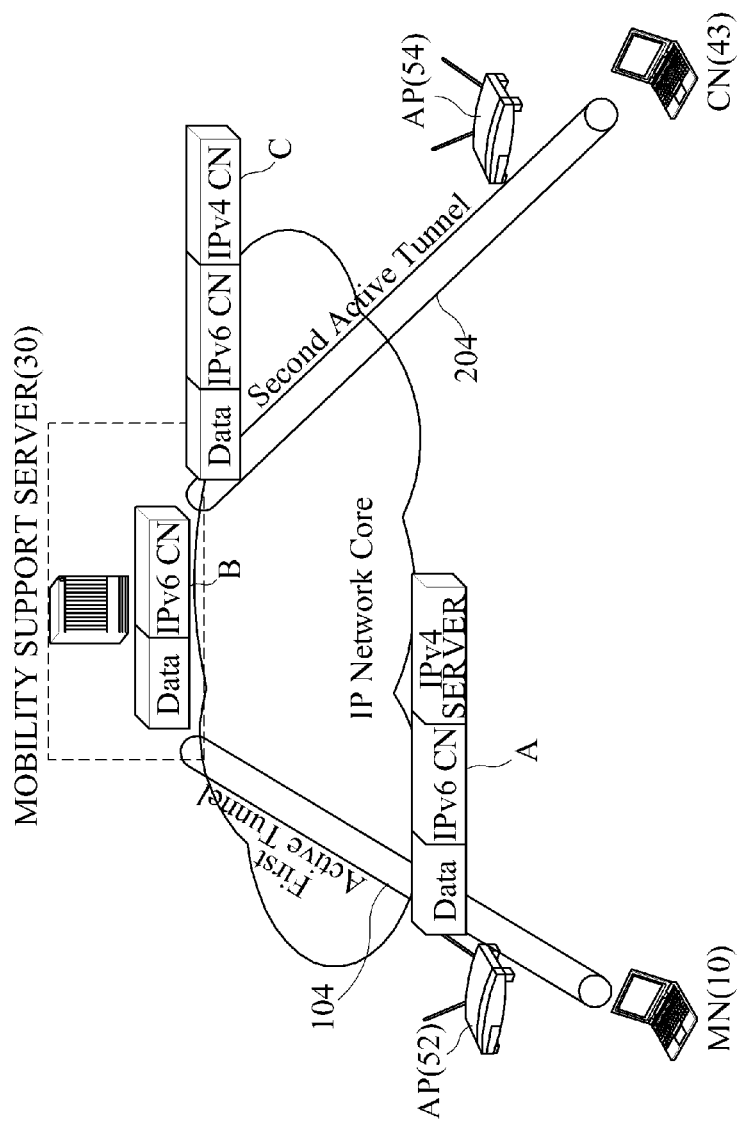
FIG. 2 is a diagram illustrating how a mobility support terminal communicates with a correspondent node through a mobility support system in FIG. 1.

FIG. 2 is a diagram illustrating how the mobility support terminal 10 communicates with the correspondent node 43 through the mobility support system in FIG. 1. In FIG. 2, it is assumed that the mobility support terminal 10 and the correspondent node 43 communicate with each other in IPv6 (HoA, Home Address) over IPv4 network (CoA, Care of Address). In FIG. 2, the gateways or routers denoted by reference numerals 22 and 24 in FIG. 1 are not shown, and the standby tunnel is not shown since it is not used for ongoing communication. Reference numerals 52 and 54 may be points of attachment (POA) of a wireless access network on which an active tunnel is established. For example, POA may be an access point (AP) on Wi-Fi network or a WiBro radio access station (RAS).

Referring to FIG. 2, the mobile node (MN) 10 makes a first IPv6 packet (A), including data to be sent to the correspondent node (CN) 43, and transmits the first IPv6 packet through a first active tunnel. As described above, since the mobile node 10 and the correspondent node 43 communicate in IPv6 over IPv4 network, the first IPv6 packet (A) includes data, an IPv6 header (IPv6 CN) including information about the correspondent node 43 set as a destination, and an IPv4 header (IPv4 server) including information about the IPv4 server set as a destination to use the IPv4 network. The mobile node 30 receives a second IPv6 packet (B) through the first active tunnel. The second IPv6 packet (B) has a format where the IPv4 header is eliminated from the first IPv6 packet (A) as the first IPv6 packet (A) passes through the IPv4 network. The mobility support server 30 generates a third IPv6 packet (C) and sends it to the correspondent node 43 through the second active tunnel. Since the third IPv6 packet (C) is also sent to the correspondent node 43 over the IPv4 network, the third IPv6 packet (C) has a format where an IPv4 header (IPv4 CN) is added to the second IPv6 packet (B).

Figure 3:
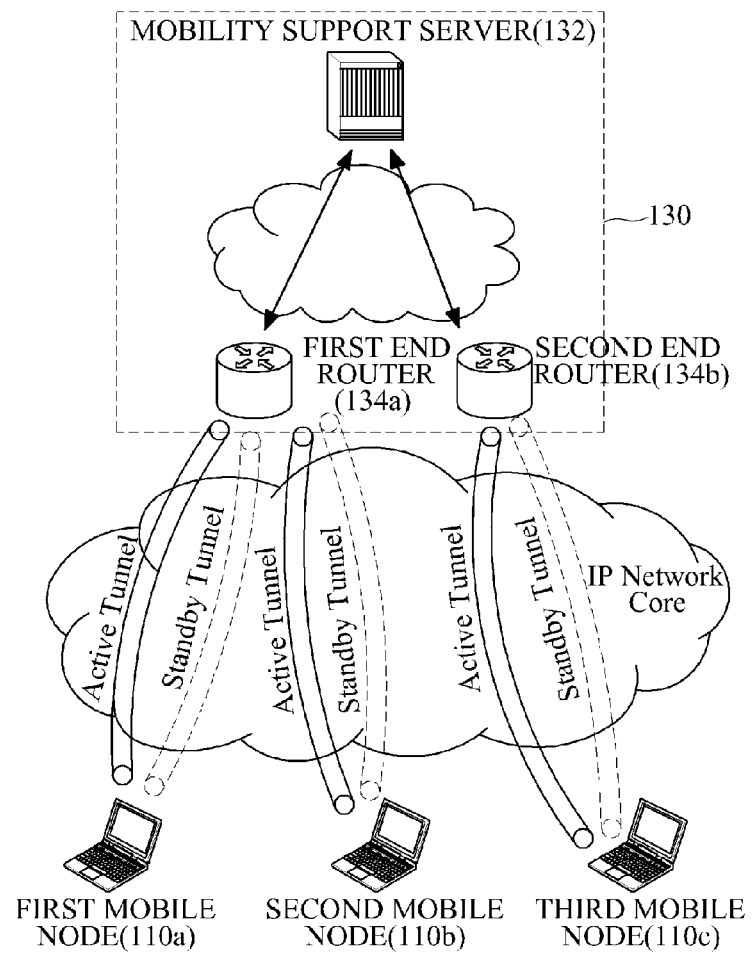
FIG. 3 is a diagram illustrating an exemplary mobility support system including an exemplary tunneling-based mobility support apparatus.

FIG. 3 is a diagram illustrating an exemplary mobility support system including an exemplary tunneling-based mobility support apparatus.

Referring to FIG. 3, the mobility support apparatus 130 includes a mobility support server 132 and a plurality of end routers 134a and 134b. Each of the end routers 134a and 134b establishes a pair of IP tunnels, i.e., an active tunnel and a standby tunnel, with one of mobile nodes 110a, 110b and 110c. At the request of one of the mobile nodes 110a, 110b and 110c (e.g., mobile node 110a), the mobility support server 132 selects one of the end routers 134a and 134b (e.g., first end router 134a) to establish an IP tunnel with the mobile node 110a. The first mobile node 110a acquires a tunnel end address to generate a tunnel to the selected first end router 134a and establishes an active tunnel and a standby tunnel with the first end router 134a.

Each of the mobile nodes 110a, 110b and 110c is a mobility support terminal which supports a plurality of interfaces and supports an IPv6 mobility between the interfaces. The mobile node 110a, 110b or 110c acquires a tunnel end IP address of one of the end routers 134a and 134b from the mobility support server 132. The mobile node 110a, 110b or 110c establishes a pair of IP tunnels with the end router through two interfaces using the acquired tunnel end IP address. The pair of IP tunnels serve as active and standby tunnels according to a predetermined criterion. The IP tunnel may be, but not limited to, an IPv6-IPv4 tunnel.

Each of the end routers 134a and 134b may be configured to be, but not limited to, a dual-stack router which processes both IPv4 and IPv6 data. At the request of the mobility support server 132, the end router 134a or 134b establishes a pair of IP tunnels (e.g., IPv6-IPv4 tunnel) with the mobile node 110a, 110b or 110c which has requested a tunnel establishment, and communicates with the mobile node 110a, 110b or 110c through the established tunnel. The end routers 134a and 134b may make an IPv6 communication through transmission control protocol (TCP) to exchange an IPv4/IPv6 message (e.g., tunnel establishment request/reply message) with the mobility support server 132. The end routers 134a and 134b may register with the mobility support server 132 according to a predetermined procedure when initially connecting to the mobility support server 132. The end routers 134a and 134b may send the mobility support server 132 information about the number of currently established tunnels and/or the number of available tunnels upon the registration or at regular or irregular intervals after the registration.

The end routers 134a and 134b may determine a type of service tunnel (e.g., IPv4-over-IPv4 tunnel, IPv6-over-IPv4 tunnel or the like), prepare for establishment of a TCP connection, transmit and receive internal events, exchange messages with the mobility support server, or set tunnel information on data plane, for example.

The mobility support server 132 is configured to support a mobility of the mobile nodes 110a, 110b and 110c between heterogeneous interfaces. In response to a tunnel establishment request from one of the mobile nodes 110a, 110b and 110c, the mobility support server 132 selects one of the end routers 134a and 134b according to a predetermined criterion. The mobility support server 132 sends information to the mobile node and the selected end router so that IP tunnels (i.e., active and standby tunnels) may be established between the mobile node and the selected end router. The mobility support server 132 is also configured to serve as a control server to maintain, manage, terminate or switch the established tunnels.

The mobility support server 132 registers new end routers if the new end routers are added to the mobility support apparatus 130 as the number of mobile nodes are increased. The mobility support server 132 stores information about the new end routers, and regularly monitors status information about all of end routers which have been registered at regular and/or irregular intervals.

The mobility support server 132 may determine an end router, establish a TCP connection with an end router, exchange messages with an end router, select an end router, select a tunnel end address of an end router, or establish/delete/maintain/switch a tunnel to an end router, for example.

When receiving a tunnel establishment request from a mobile node, the mobility support server selects an end router to establish an IP tunnel with the mobile node based on predetermined criteria (e.g., service tunnel, number of tunnels, end router with the lowest traffic load, address prefix and/or random election). The end router may hold a plurality of tunnel end IP addresses. In this case, the mobility support server may select an appropriate end router in view of a control server and select an appropriate one of tunnel end IP addresses of the selected end router.

Figure 4:
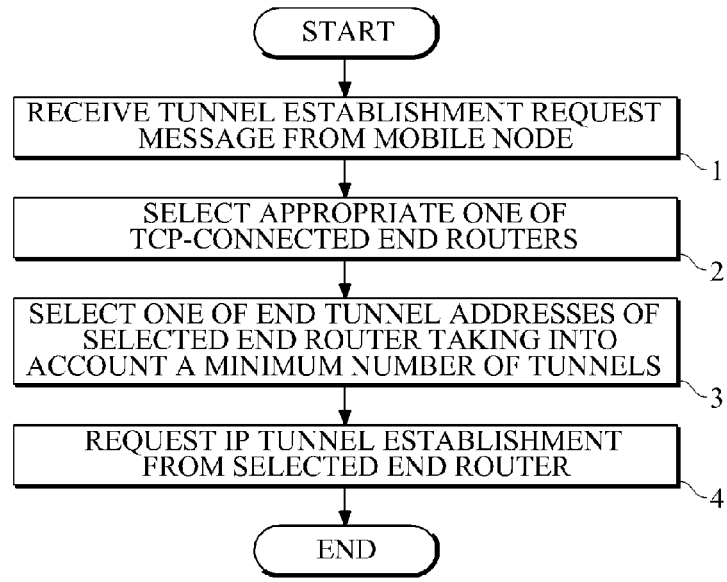
FIG. 4 is a flow chart illustrating a process where a mobility support server selects an appropriate end router for a mobile node making a tunnel establishment request and selects an appropriate one of tunnel end IP addresses of the end router.

FIG. 4 is a flow chart illustrating a process where a mobility support server selects an appropriate end router for a mobile node making a tunnel establishment request and selects an appropriate one of tunnel end IP addresses of the end router.

Referring to FIG. 4, the mobility support server receives a tunnel establishment request message from the mobile node (operation 1). The tunnel establishment request message includes a specific condition (e.g., type of tunnel) requested by the mobile node in association with a tunnel to be established. The mobility support server selects one of registered end routers which meets the requested condition (e.g., which supports the requested type of tunnel) (operation 2). In this case, the mobility support server may select an appropriated end router taking into account a total number of tunnels of, availability (amount of traffic) of, or prefix of each end router. Among a plurality of tunnel end addresses of the selected end router, a tunnel end address is selected for the mobile node taking into account a currently established number of tunnels through each tunnel end address (operation 3). Once the tunnel end address is selected, a corresponding end router establishes an IP tunnel for the mobile node through the selected tunnel end router (operation 4). At the same time, the corresponding end router sends the mobile node a tunnel establishment response message including the selected tunnel end address. The mobile node may establish an IP tunnel to the end router using the tunnel end address.

Figure 5:
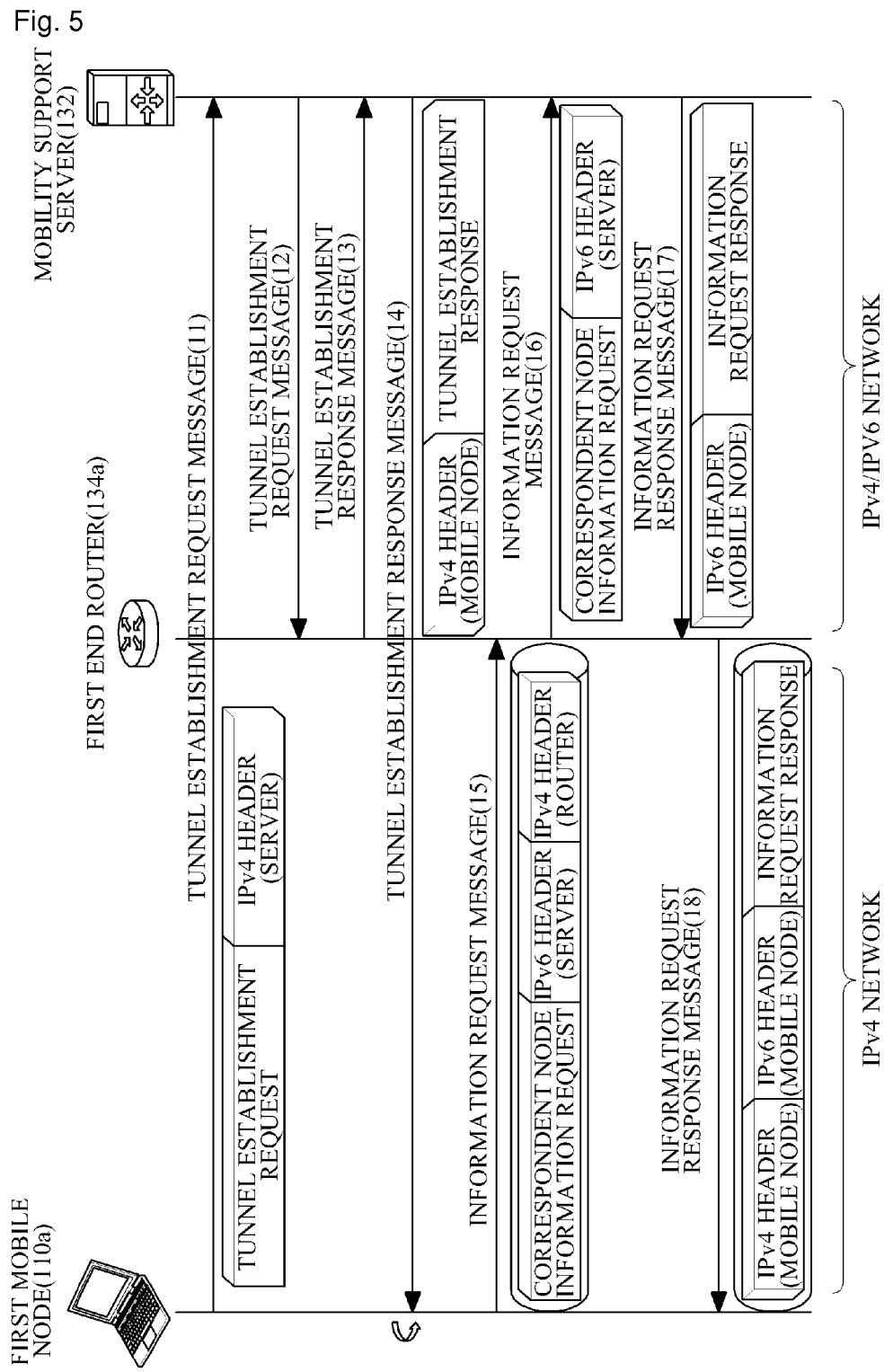
FIG. 5 is a packet flow chart illustrating a process where a mobile node establishes active and standby tunnels with an end router of a mobility support apparatus and acquires address information of a correspondent node through the active tunnel.

FIG. 5 is a packet flow chart illustrating a process where the mobile node 110a establishes active and standby tunnels with the first end router 134a of the mobility support apparatus 130 and communicates with a correspondent node through the active tunnel in the mobility support system in FIG. 3. Since the process of establishing the active tunnel shown in FIG. 5 may be applied to a process of establishing a standby tunnel, only a process where the first mobile node 110a establishes an active tunnel with the first end router 134a will now be described. In FIG. 5, the packet flow chart illustrates that an IPv6 mobile node uses an IPv4 network. The first end router 134a is connected in IPv4/IPv6 to the mobility support server 132. The mobility support server 132 may be an IPv4/IPv6 dual-stack server.

Referring to FIG. 5, the first mobile node 110a sends a tunnel establishment request message to the mobility support server 132 in IPv4 communication (operation 11). The tunnel establishment request message may be of a format where an IPv4 header designating the mobility support server 132 as a destination is added to information about the tunnel establishment request (e.g., tunnel establishment request including a specific condition on the tunnel to be established).

After receiving the tunnel establishment request message from the first mobile node 110a, the mobility support server 132 selects one of the end routers 134a and 134b (e.g., first end router 134a) according to a predetermined criterion and sends the tunnel establishment request message to the selected first end router 134a (operation 12). If the selected end router 134a holds a plurality of tunnel end addresses, as described with reference to FIG. 4, the mobility support server 132 may select an appropriate one of the tunnel end addresses and send the tunnel establishment request message to the selected end router 134a.

After receiving the tunnel establishment request message, the selected first end router 134a generates an IP tunnel for the first mobile node 110a through the selected tunnel end address. In response to the tunnel establishment request message, the first end router 134a sends a tunnel establishment response message to the mobility support server 132 (operation 13). The mobility support server 132 sends the tunnel establishment response message to the firs mobile node 110a in IPv4 communication (operation 14). The tunnel establishment response message may also be of a format where an IPv4 header designating the first mobile node 110a as a destination is added to information about the tunnel establishment response. The tunnel establishment response message includes the selected tunnel end address, e.g., IPv4 address, of the selected first end router 134a. The IPv4 address of the first end router 134a is used for the first mobile node 110a to establish an IP tunnel with the first end router 134a. Although not shown in FIG. 5, the first mobile node 110a uses the received IPv4 address to establish the IP tunnel with the first end router 134a.

The first mobile node 110a sends an information request message about a correspondent node (operation 15). The information request message is first sent to the first end router 134a through the established IP tunnel. The information request message may be of a format including a message instructing a correspondent node information request, an IPv6 header (IPv6 server) designating the mobility support server 132 as a last destination, and an IPv4 header (IPv4 router) designating the first end router 134a as a destination. The first end router 134a refers to a destination contained in the IPv6 header of the information request message to send the information request message to the mobility support server 132 (operation 16). The information request message includes a message instructing a correspondent node information request and an IPv6 header (IPv6 server) designating the mobility support server 132 as a destination.

The mobility support server 132 sends an information request response message including the requested address of the correspondent node to the first end router 134a (operation 17). The information request response message includes a response to the information request and an IPv6 header (IPv6 header mobile node) designating the first mobile node 110a as a destination. The first end router 134a forwards the information request response message through the established IP tunnel (operation 18). The information request response message further includes an IPv4 header designating the first mobile node 110a as a destination, which is added to the information request response message received from the mobility support server 130, since a tunnel for the IPv6 header mobile node is used.

After establishing the IP tunnel with the first end router 134a and acquiring the address information of the correspondent node, the first mobile node 110a sends a message to be forwarded to the correspondent node to the first end router 134a through the established IP tunnel (active tunnel, or activated standby tunnel on handover). The first end router 134a forwards the message received from the first mobile node 110a to the correspondent node through another IP tunnel which is established with the correspondent node.

Figure 6:
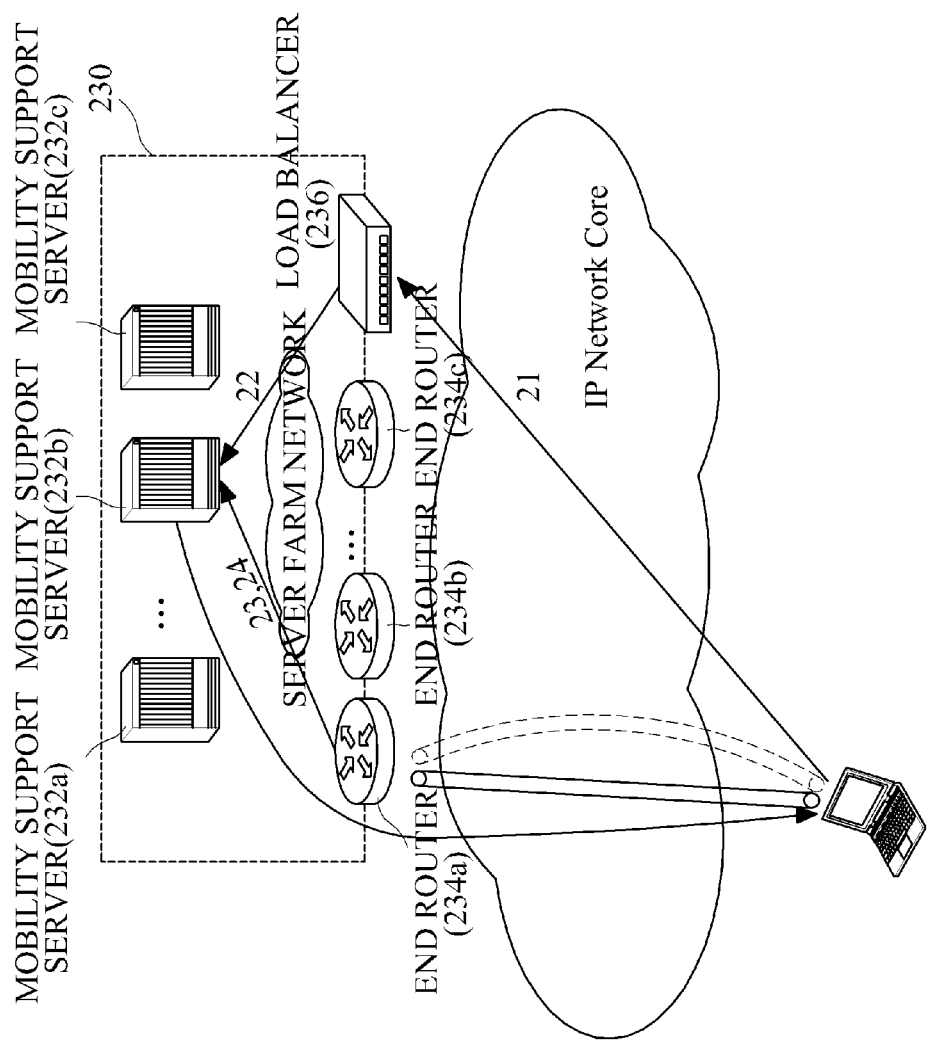
FIG. 6 is a diagram illustrating an exemplary mobility support system including an exemplary tunneling-based mobility support apparatus.

FIG. 6 is a diagram illustrating an exemplary mobility support system including an exemplary tunneling-based mobility support apparatus. The mobility support apparatus 230 may expand its capacity in an active and flexible manner as the number of subscribers increases. The current example will now be described in detail in comparison with the example described with reference to FIG. 3.

Referring to FIG. 6, the mobility support apparatus 230 includes a plurality of mobility support servers 232a, 232b and 232c and a plurality of end routers 234a, 234b and 234c. Each of the mobility support server 232a, 232b and 232c and each of the end routers 234a, 234b and 234c may be configured to communicate with each other in a server farm IPv4/IPv6 network. In the current example, the number of end routers 234a, 234b and 234c and the number of mobility support servers 232a, 232b and 232c may be dynamically extended according to the number or capacity of subscribers who have subscribed for mobility support services.

The mobility support apparatus 230 further includes a load balancer 236. The load balancer 236 is adapted to adjust loads between the mobility support servers 232a, 232b and 232c. When receiving a tunnel establishment request message from the mobile node 110, the load balancer 236 selects one of the mobility support servers 232a, 232b and 232c to provide a mobility service to the mobile node 10 based on a predetermined algorithm supporting load balancing, such as round-robin algorithm or hash algorithm. Accordingly, when receiving a tunnel establishment request message from the mobile node 110, the load balancer 236 forwards the tunnel establishment request message to a selected mobility support server, e.g., second mobility support server 232b. The remaining operations for establishing the IP tunnel may be performed similarly to the operations 12 to 14 which have been described with reference to FIG. 5.

More specifically, the mobile node 210 sends a tunnel establishment request message to the load balancer 236 (operation 21). The load balancer 236 forwards the tunnel establishment request message to a mobility support server selected according to a predetermined criterion, e.g., second mobility support server 232b (operation 22). After receiving the tunnel establishment request message from the load balancer 236, the second mobility support server 232b selects one of currently registered end routers 234a, 234b and 234c (or a tunnel end address if the end router holds a plurality of tunnel end addresses) based on a predetermined criterion, such as number of available tunnels, amount of traffic, address prefix or random election, and forwards the tunnel establishment request message to the selected end router, e.g., first end router 234a (operation 23). The first end router 234a generates a tunnel and notifies the mobility support server 232b of a tunnel generation result (operation 24). The mobility support server 232b sends a response to the tunnel establishment request message, e.g., tunnel establishment response message, to the mobile node 210 (operation 25). The tunnel establishment response message includes an end address of an IP tunnel to be established, i.e., tunnel end address of the selected end router. After receiving the tunnel establishment response message, the mobile node 210 establishes an IP tunnel to the end address of the IP tunnel which is contained in the received message.

Figure 7:
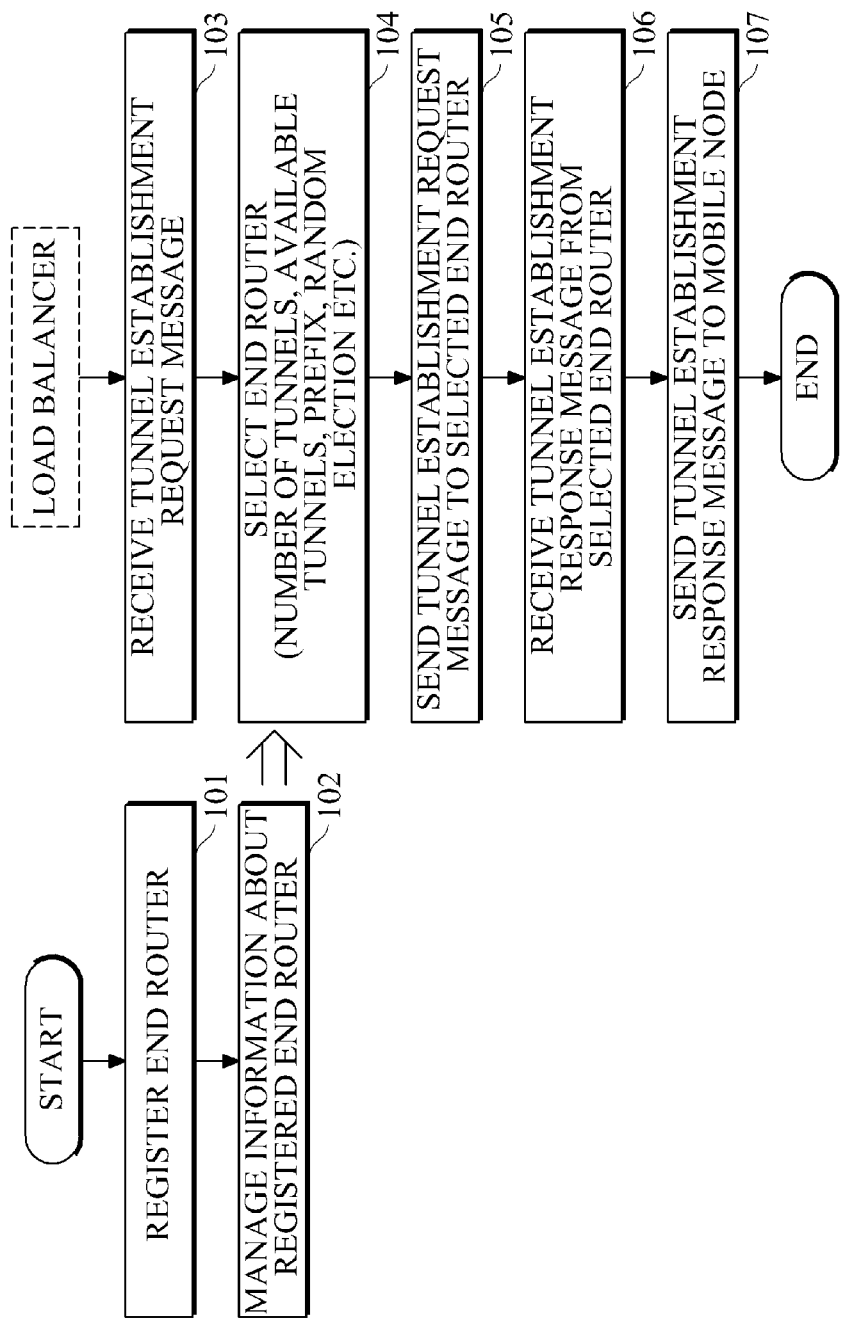
FIG. 7 is a flow chart illustrating an operation or processing mechanism of each of mobility support servers which are included in a mobility support apparatus in FIG. 6.

FIG. 7 is a flow chart illustrating an operation or processing mechanism of each of the mobility support servers 232a, 232b and 232c which are included in the mobility support apparatus 230 in FIG. 6.

Referring to FIG. 7, operation 101 is a process of the mobility support server registering information about the end router, and operation 102 is a process of the mobility support server managing the information about the end router. More specifically, if the mobility support server receives a command to add an end router, the mobility support server additionally registers the end router accordingly (operation 101). The command to add an end router may be, but not limited to, a signal which is input by an operator. The mobility support server manages and stores information about end routers which can be communicated therewith (operation 102). The information is for the mobility support server to select and manage end routers (and tunnel end addresses), such as a list of tunnel end addresses owned by each corresponding end router or the number of tunnels established through each of tunnel end addresses. The information may be transmitted from each of the end routers at regular or irregular intervals or by request.

Operations 103 to 107 illustrate a process or mechanism in the mobility support server for supporting a tunnel establishment procedure between the end router and the mobile node. The mobility support server receives a tunnel establishment request message (operation 103). The tunnel establishment request message may be, but not limited to, a message received from the load balancer (see FIG. 6). The mobility support server selects one of the end routers to respond to the received tunnel establishment request message based on a predetermined criterion (operation 104). In operation 104, if the selected end router holds a plurality of tunnel end addresses, the mobility support server may select one of the tunnel end addresses. The mobility support server may select the end router (or tunnel end address), for example, based on the number of tunnels used by the end router, the availability of the tunnels (e.g., amount of traffic), prefix and/or random election, or a combination thereof. In addition, the mobility support server may select the end router (or tunnel end address) based on a type of tunnel, for example, IPv4-over-IPv4, IPv6-over-IPv4, IPv4-over-IPv6 or IPv6-over-IPv6. The selection criteria may be determined by an operator.

The mobility support server sends the tunnel establishment request message to the selected end router (operation 105). The end router receives the tunnel establishment request message and establishes an IP tunnel for the mobile node. The mobility support server receives a tunnel establishment response message from the end router (operation 106), and forwards the tunnel establishment response message to the mobile node (operation 107). The tunnel establishment response message includes an IP address of the end router, i.e., end address of the IP tunnel. The IP address is used for the mobile node to establish an IP tunnel with the end router.

Figure 8:
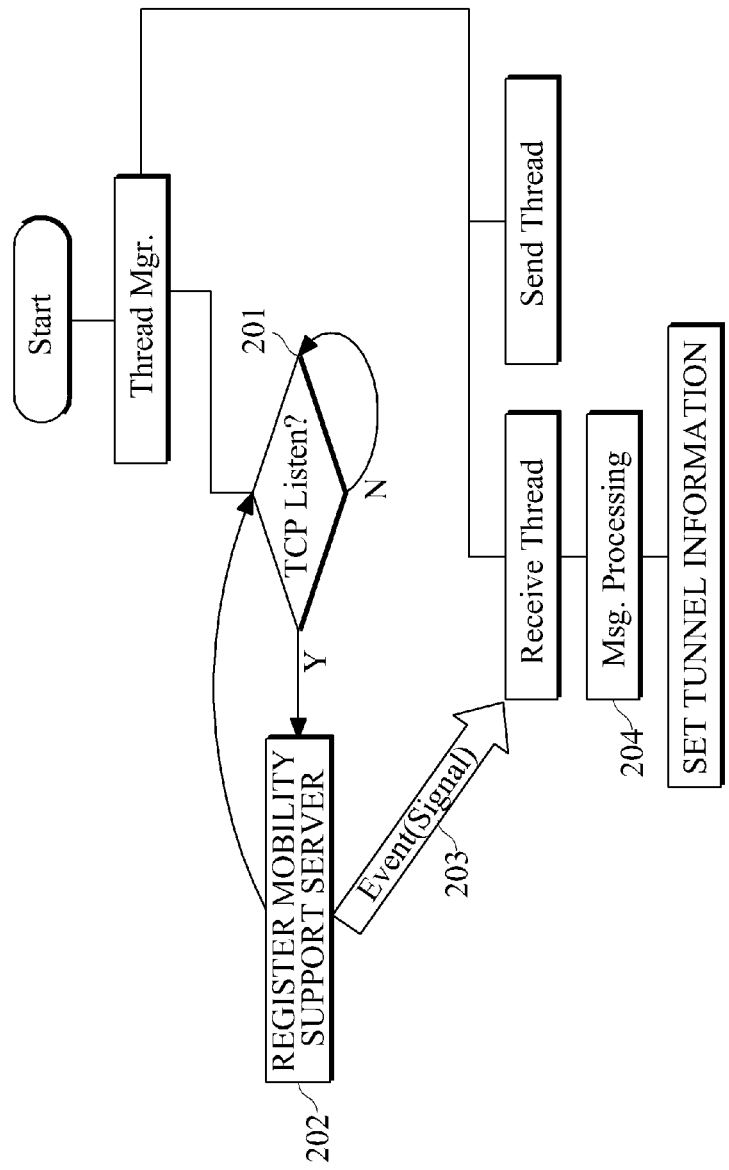
FIG. 8 is a flow chart illustrating a mechanism for each end router in a mobility support apparatus in FIG. 6 to manage a mobility support server.

FIG. 8 is a flow chart illustrating a mechanism for each of the end routers 234a, 234b and 234c in the mobility support apparatus 230 in FIG. 6 to manage the mobility support server. As described above, the end router communicates in TCP with the mobility support server and acts as a server in view of TCP.

Referring to FIG. 8, the end router prepares for a TCP connection (operation 201). If the mobility support server makes a TCP connection, the end router registers the mobility support server (operation 202). In this case, the end router may store information about the mobility support server in a shared memory to perform the registration operation. The end router notifies a message receive function, such as a receive thread, and a message send function, such as a send thread, that a new mobility support server has been registered (operation 203). In this case, since the message receive function and the message send function are working in threads in the same processor, the end router may use an event signal to notify the message receive function and the message send function.

After being notified that a new mobility support server has been registered, the message receive function and the message send function may, if necessary, acquire the information about the registered mobility support server from the shared memory and use the information upon transmission or reception. More specifically, when receiving a tunnel establishment request message from the mobility support server, the message receive function processes the received message and inserts tunnel information into data plane to be used for tunneling (operation 204). For this operation, the message receive function, i.e., receive thread, needs the information about the registered mobility support server to receive the message from the mobility support server. The message send function, i.e., send thread, uses the information about the registered mobility support server to send a tunnel establishment request response message or a message notifying the mobility support server of its status, e.g., a Keep Alive message.

Unless the registration of the new mobility support server is notified in real time, the message receive function will not receive a message from the mobility support server and the message send function will not send a message to the mobility support server or not send the message in real time. For example, if an end router communicates with a single mobility support server, which is registered with the end router, the end router awaits only to receive a message from the registered mobility support server according to a TCP/IP mechanism. Unless the end router recognizes that a new mobility support server has been added, the message receive function may not receive a message from the new mobility support server since the message is not from the registered mobility support server. As a result, the message receive function keeps waiting for a message only from the registered mobility support server. If the message receive function receives an event signal as in the above-mentioned example, the message receive function of the end router may prepare to receive a message from the new mobility support server.

Figure 9:
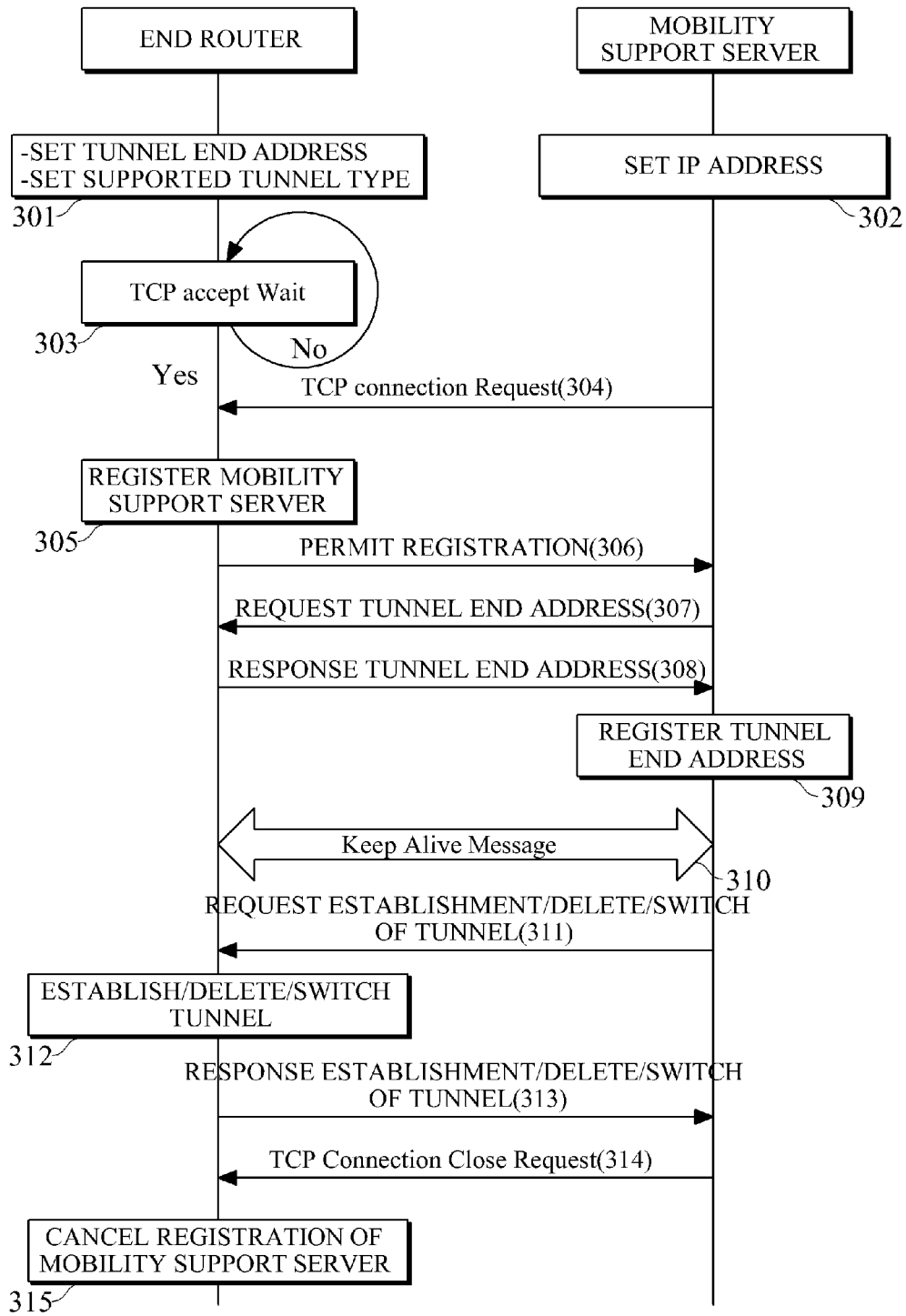
FIG. 9 is a diagram illustrating a protocol process between an end router and a mobility support server which are included in a mobility support apparatus in FIG. 6.

FIG. 9 is a diagram illustrating a protocol process between the end router 234a, 234b or 234c and the mobility support server 232a, 232b or 232c which are included in the mobility support apparatus 230 in FIG. 6.

The end router sets information such as a tunnel end address and a supported tunnel type by an operator of the end router (operation 301). The tunnel end address may be a tunnel end IPv4 address, for example (in IPv4-over-IPv4 or IPv6-over-IPv4 tunnel). The end router may hold a plurality of tunnel end addresses. The tunnel type information may be IPv4-over-IPv4, IPv6-over-IPv4, IPv4-over-IPv6 or IPv6-over-IPv6, for example. The mobility support server sets its own IP address (operation 302). For example, if the mobility support server an IPv4/IPv6 dual-stack server, it sets both IPv4 and IPv6 addresses.

The end router awaits a TCP connection request signal (operation 303). In the meantime, if the end router receives a TCP connection request signal from the mobility support server (operation 304), the end router performs a registration procedure by storing information about the mobility support server in a shared memory and the like (operation 305). Once the registration is completed, the end router sends an event signal to notify its own send and receive threads of the completed registration and notifies the mobility support server of the completed registration (operation 306).

The mobility support server sends the end router a message requesting tunnel end address information (operation 307). In response, the end router sends the mobility support server a tunnel end address response message including the tunnel end address information (operation 308). The mobility support server registers the received tunnel end address of the end router (operation 309). Once the registration procedure is completed between the end router and the mobility support server, both of the end router and the mobility support server are prepared to provide a service to each other. The end router and the mobility support server exchange a Keep Alive message with each other at regular intervals or if necessary to keep monitoring each other's status (operation 310).

After receiving a tunnel establishment request message from a mobile node or a load balancer, the mobility support server forwards the tunnel establishment request message to the end router, and sends a tunnel switch request message and/or a tunnel delete request message to the end router (operation 311). After receiving the tunnel establishment/delete/switch request message from the mobility support server, the end router establishes a new tunnel with the mobile node, or deletes or switches the established tunnel (operation 312). That is, the mobility support server manages an IPv6 route by establishing, switching or deleting the IP tunnel between the mobile node and the end router. The end router sends a tunnel establishment/delete/switch response message to the mobility support server (operation 313).

The mobility support server is shut down or sends a TCP Connection Close message to the end router, if necessary (operation 314). After receiving the TCP Connection Close message from the mobility support server, the end router cancels the registration of the mobility support server. In this case, the end router may send an event signal to notify the send and receive threads that the registration of the mobility support server has been cancelled.

Table 1 shows messages exchanged between the end router and the mobility support server in the protocol process in FIG. 9. In Table 1, the messages are designated for illustrative purposes only.

TABLE 1

| Tunnel Related Messages | Keep Alive Msg. | 0 × 01 |
|---|---|---|
| | Server Register Msg. | 0 × 02 |
| | Tunnel End Request Msg. | 0 × 03 |
| | Tunnel End Response Msg. | 0 × 04 |
| | Tunnel Operation Request Msg. | 0 × 05 |
| | Tunnel Operation Response Msg. | 0 × 06 |
| | Tunnel Delete All Msg. | 0 × 07 |

TABLE 1-continued

| Dualizing Related Message | TGW Role Msg. | 0 × 08 |
|---|---|---|
| Query Related Messages | TGW Query Request Msg. | 0 × 09 |
| | TGW Query Response Msg. | 0 × 10 |
| Notify Related Message | TGW Notify Msg. | 0 × 11 |

Referring to Table 1, the messages in a communication between the end router and the mobility support server are classified into tunnel-related messages, dualizing-related messages, query-related messages and notify-related messages. The tunnel-related messages are related to establishment/management/delete/switch of a tunnel between the mobile node and the end router. Examples of the tunnel-related messages include Keep Alive message, Server Register message, Tunnel End Request message, Tunnel End Response message, Tunnel Operation Request message, Tunnel Operation Response message, and Tunnel Delete All message. The dualizing-related message is related to active and standby tunnels. An example of the dualizing-related message is TGW (Tunnel GateWay) Role message. Examples of the query-related messages include TGW Query Request message and TGW Query Response message. An example of the notify-related message is TGW Notify message.

Table 2 shows elements which may be included in the messages in Table 1. More specifically, the elements are types of objects. The messages in Table 1 may be object-based messages which include one or more objects in Table 2. It should be understood that each message in Table may further include a common header which is commonly included in the message.

Table 2 shows 18 types of objects, which are only illustrative. Each of the objects may be configured to include unique information with an object header, which is commonly included.

TABLE 2

| Keep Alive Obj. | 0 × 01 |
|---|---|
| Sender Obj. | 0 × 02 |
| xGMIP Obj. | 0 × 03 |
| TGW Obj. | 0 × 04 |
| Tunnel Obj. | 0 × 05 |
| TGW Role Obj. | 0 × 06 |
| Tunnel Oper. Ack Obj. | 0 × 07 |
| Tunnel Count Query Obj. | 0 × 08 |
| Tunnel Count Response Obj. | 0 × 09 |
| Tunnel Info. Query Obj. | 0 × 10 |
| Tunnel Info. Response Obj. | 0 × 11 |
| TGW Through Put Query Obj. | 0 × 12 |
| TGW Through Put Response Obj. | 0 × 13 |
| Tunnel Through Put Query Obj. | 0 × 14 |
| Tunnel Through Put Response Obj. | 0 × 15 |
| TGW Tunnel Full Noti. Obj. | 0 × 16 |
| TGW Suspended Noti. Obj. | 0 × 17 |
| TGW Service Restart Obj. | 0 × 18 |

Figure 10:
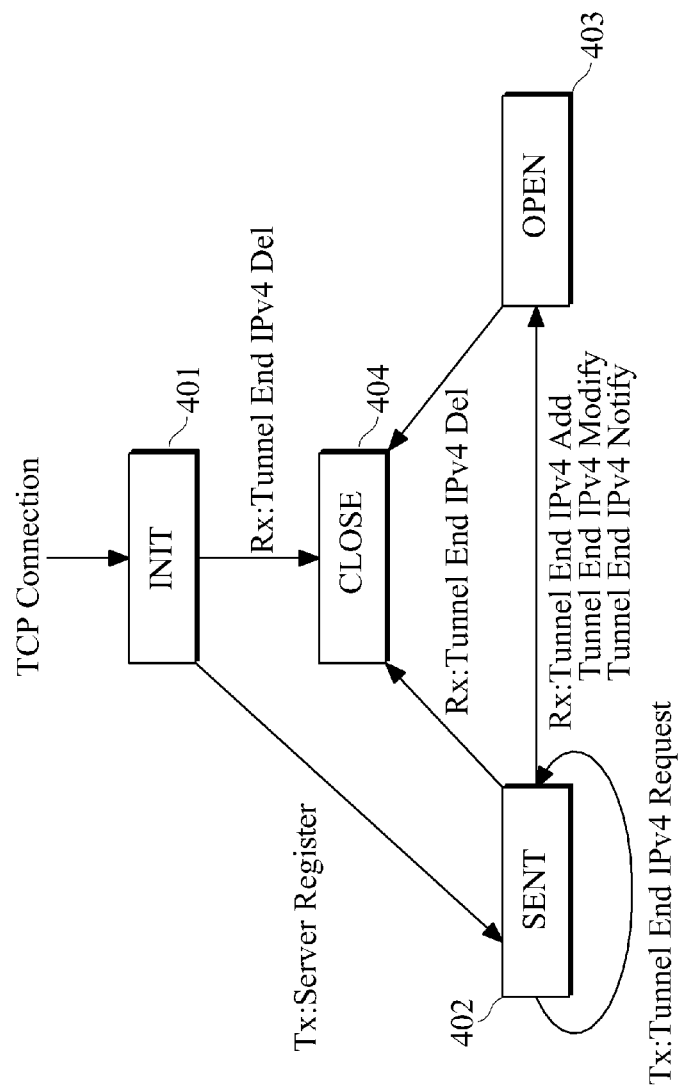
FIG. 10 is a diagram illustrating a process where an exemplary mobility support server which is included in an exemplary mobility support apparatus processes an end router making a TCP connection with the mobility support server.

FIG. 10 is a diagram illustrating a process where an exemplary mobility support server which is included in an exemplary mobility support apparatus processes an end router making a TCP connection with the mobility support server.

Referring to FIG. 10, if an initial TCP connection is made between the mobility support server and the end router, the mobility support server sets the end router to an INIT status (operation 401). The mobility support server sends a Server Register Request message to the end router, and changes the end router to a SENT status (operation 402). The mobility support server may send a different type of request message to the end router and change the end router to the SENT status. At the SENT status or an OPEN status, which will be described, the mobility support server may receive a Tunnel End Address Modify message or a Tunnel End Address Notify message from the end router.

At the SENT status, the mobility support server sends a Tunnel End Address Request message to the end router and receives in response a Tunnel End Address Response message including a tunnel end address. In this case, the mobility support server sets the end router to an OPEN status (operation 403). The OPEN status indicates that the tunneling-based mobility support service may be provided through the end router. When receiving a Tunnel End Address Delete Request message, the mobility support server sets the end router to a CLOSE status (operation 404).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

INDUSTRIAL APPLICABILITY

The present invention may be applied to a mobility support service for supporting a mobility of a mobile node on heterogeneous IP networks and a network system for this mobility support service.

The invention claimed is:

1. A tunneling-based mobility support method for a mobility support server supporting a mobility of a mobile node which has a capability to make an access over a plurality of Internet Protocol (IP) networks, the method comprising:
   receiving from the mobile node a tunnel establishment request message requesting establishment of an IP tunnel;
   making a transmission control protocol (TCP) connection to each of the plurality of end routers;
   forwarding the tunnel establishment request message to an end router which is selected, by the mobility support server, from among a plurality of end routers, wherein the selected end router has a plurality of tunnel end addresses, and wherein selecting the one of the end routers further comprises selecting one of the tunnel end addresses based on a number of IP tunnels to be established for each of the tunnel end addresses; and
   sending the mobile node a tunnel establishment response message including a tunnel end address of the selected end router when a response to the tunnel establishment request message is received from the selected end router.

2. The tunneling-based mobility support method of claim 1, wherein the tunnel establishment request message comprises tunnel type information indicating a type of the IP tunnel which the mobile node requests to establish the mobile node, and the end router is selected from among end routers supporting the IP tunnel type which is indicated by the tunnel type information.

3. The tunneling-based mobility support method of claim 1, wherein an additional TCP connection is allowed to be made to another end router in addition to the end routers.

4. A tunneling-based mobility support method for a mobility support server supporting a mobility of a mobile node which has a capability to make an access over a plurality of Internet Protocol (IP) networks, the method comprising:

receiving from the mobile node a tunnel establishment request message requesting establishment of an IP tunnel;

forwarding the tunnel establishment request message to an end router which is selected, by the mobility support server, from among a plurality of end routers; and sending the mobile node a tunnel establishment response message including a tunnel end address of the selected end router when a response to the tunnel establishment request message is received from the selected end router, wherein:

an additional TCP connection is allowed to be made to another end router in addition to the end routers, and making the additional TCP connection comprises: making another TCP connection to the other end router, sending a registration request message to the other end router so that the other end router may register the mobility support server, and receiving a tunnel end address from the other end router.

5. The tunneling-based mobility support method of claim 1, further comprising receiving a message including current status information from each of the end routers.

6. A tunneling-based mobility support method for a mobility support apparatus supporting a mobility of a mobile node which has a capability to make an access over a plurality of Internet Protocol (IP) networks, the method comprising:

receiving from the mobile node a tunnel establishment request message requesting establishment of an IP tunnel;

in response to the tunnel establishment request message, selecting one mobility support server from a plurality of mobility support servers to control a mobility service for the mobile node included in the mobility support apparatus;

selecting, by the selected mobility support server, an end IP tunnel of a selected one of the end routers from a plurality of end routers to establish an IP tunnel with the mobile node included in the mobility support apparatus, wherein the selected end router has a plurality of tunnel end addresses, and wherein selecting the one of the end routers further comprises selecting one of the tunnel end addresses based on a number of IP tunnels to be established for each of the tunnel end addresses;

making a transmission control protocol (TCP) connection to each of the plurality of end routers; and sending the mobile node a tunnel establishment response message including a tunnel end address of the selected end router.

7. The tunneling-based mobility support method of claim 6, wherein the mobility support server is selected by a load balancer included in the mobility support apparatus.

8. The tunneling-based mobility support method of claim 7, wherein the tunnel establishment request message is received by the load balancer from the mobile node, and the load balancer forwards the tunnel establishment request message to one mobility support server which is selected from the plurality of mobility support servers according to a predetermined algorithm.

9. The tunneling-based mobility support method of claim 8, wherein the load balancer is configured to select a mobility support server using a round-robin algorithm or a hash algorithm.

10. The tunneling-based mobility support method of claim 8, wherein the selected mobility support server selects one end router from a plurality of end routers which are TCP connected to the mobility support server, forwards the tunnel establishment request message to the selected end router and, when receiving a response to the tunnel establishment request message from the selected end router, sends the mobile node a tunnel establishment response message including a tunnel end address of the selected end router.

11. The tunneling-based mobility support method of claim 10, wherein the selected mobility support server selects one end router from the plurality of end routers based on at least one of a number of tunnels of, availability of and prefix of each end router.

12. The tunneling-based mobility support method of claim 11, wherein the selected end router has a plurality of tunnel end addresses, and wherein the selected mobility support server further selects one tunnel end address from the plurality of tunnel end addresses based on a number of IP tunnels to be established for each of the tunnel end addresses after selecting the end router.

13. The tunneling-based mobility support method of claim 10, wherein the mobility support apparatus allows another end router to be added in addition to the end routers.

14. The tunneling-based mobility support method of claim 10, wherein each of the mobility support servers receives a message including current status information from each of the end routers.

* * * * *